April 2, 1968 R. A. LARSON ETAL 3,376,180
METHOD AND APPARATUS FOR FORMING A SPIRAL WOUND TUBE
HAVING AN EXTRUDED PLASTIC LINER
Filed July 31, 1963 2 Sheets-Sheet 2
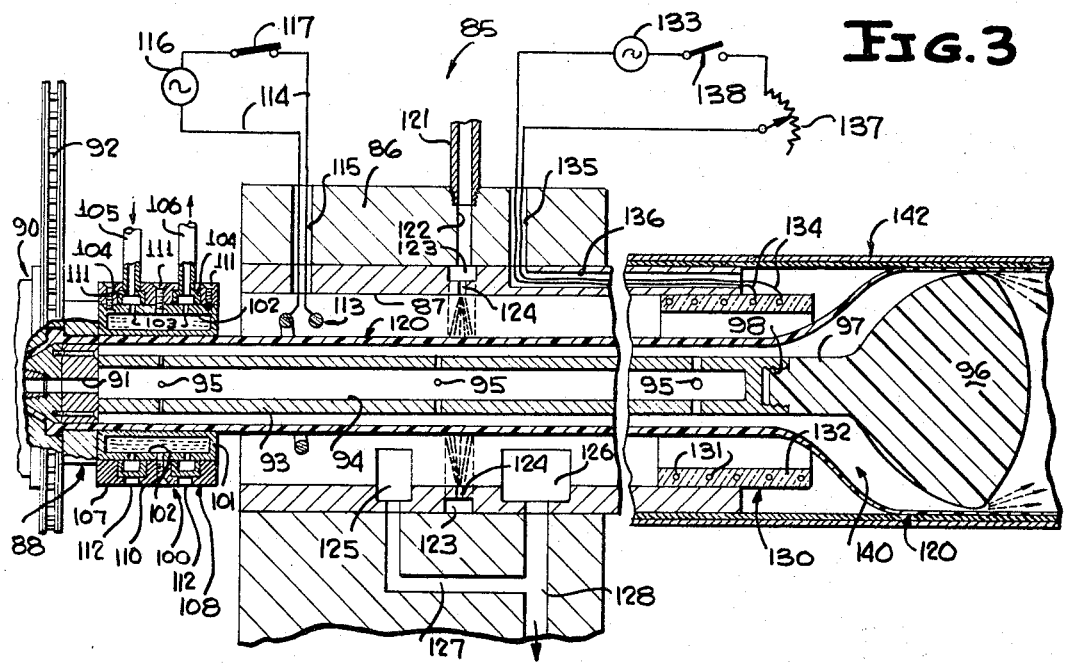
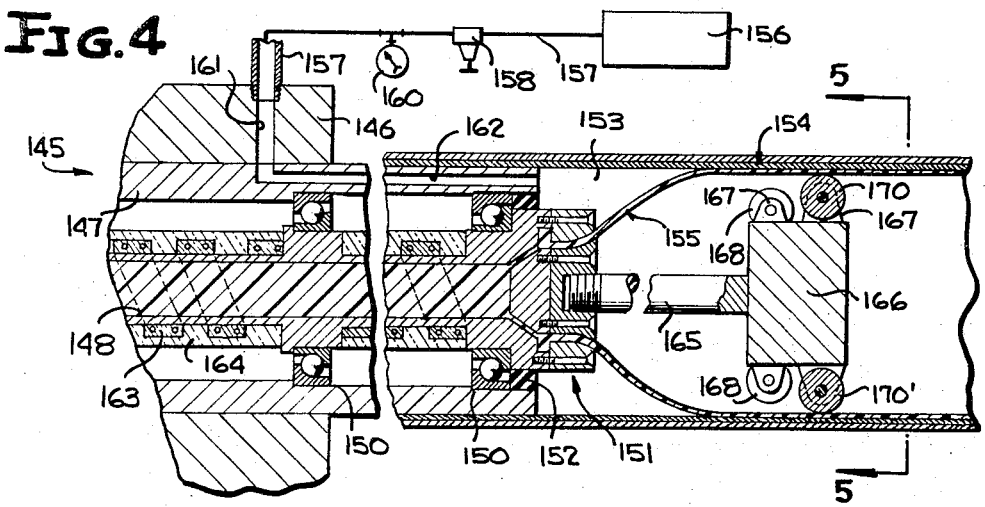
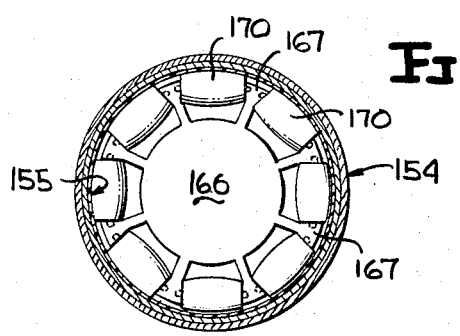
INVENTORS
RALPH A. LARSON, CURTIS E. MAIER
& RONALD L. MILLAR
BY Mason Porter, Diller & Stewart
ATTORNEYS United States Patent Office 3,376,180
Patented Apr. 2, 1968

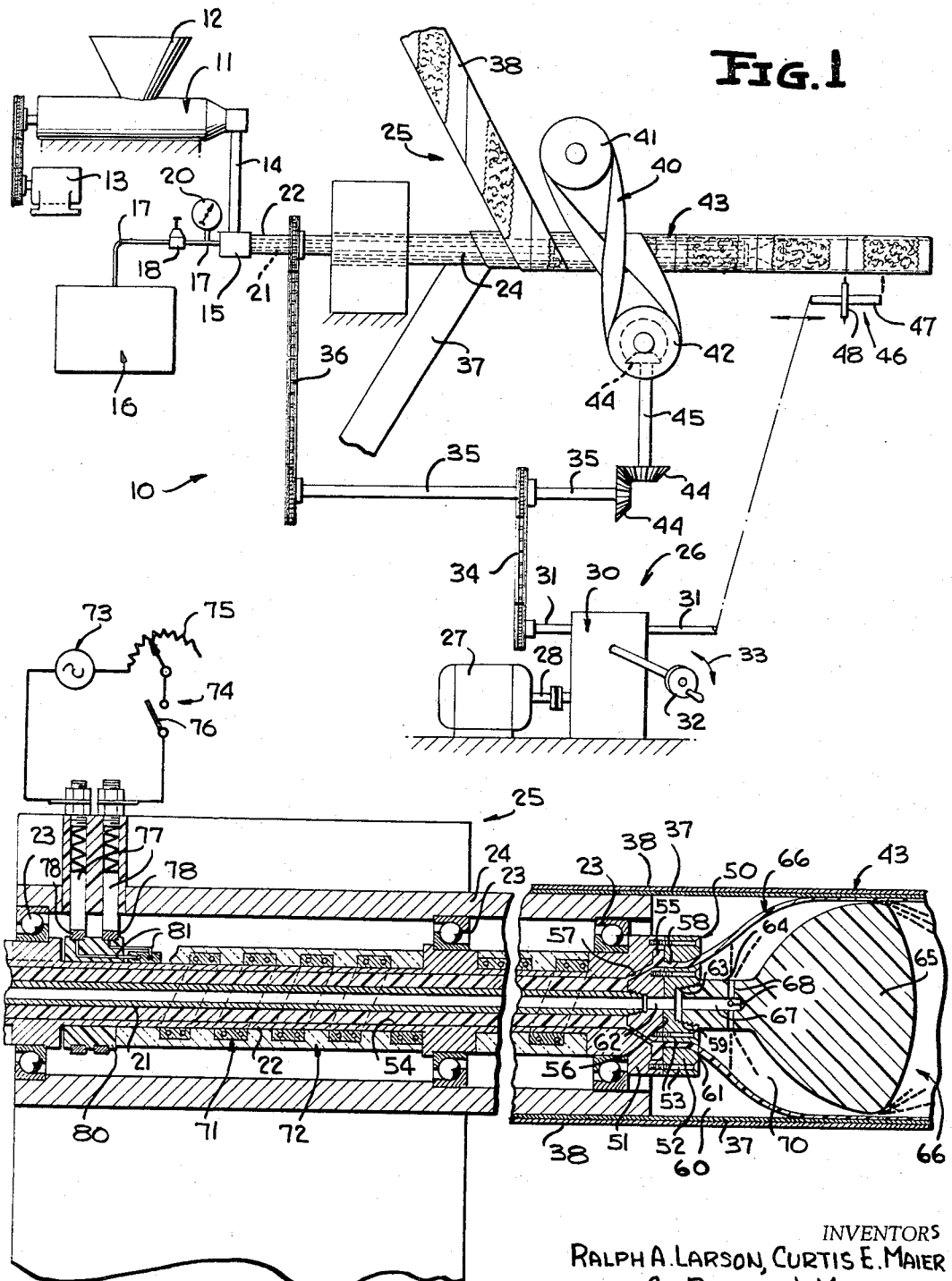

3,376,180
METHOD AND APPARATUS FOR FORMING A SPIRAL WOUND TUBE HAVING AN EXTRUDED PLASTIC LINER
Ralph A. Larson, Michigan City, Ind., Ronald L. Millar, Elmhurst, Ill., and Curtis E. Maier, Koenigstein, Germany, assignors to Continental Can Company, Inc., New York, N.Y., a corporation of New York
Filed July 31, 1963, Ser. No. 298,985
25 Claims. (Cl. 156—195)

ABSTRACT OF THE DISCLOSURE

This invention relates to a novel apparatus for forming a spiral wound tube and at the same time extruding a tubular lining into the interior of the spirally wound tube and securing the same thereto. The tube is formed by winding webs upon a rotating mandrel during the simultaneous extrusion of the lining from an extrusion nozzle associated with the mandrel. The formed tubular lining is urged radially outwardly into contact with the interior of the tube by means of a source of vacuum in fluid communication with a chamber between the tubular lining and the tube.

An object of this invention is to provide a novel apparatus for extruding a tubular lining and securing the same to an interior surface of a spiral wound tube, the apparatus including an elongated extruder extension provided with an extrusion nozzle at one end thereof, an extrusion orifice of the extrusion nozzle being in communication with a source of flowable lining material, and means for urging a tubular lining extruded through the extrusion orifice into contact with the interior of a spiral wound tube to line the tube with the flowable lining material.

Another object of this invention is the provision of a novel device for simultaneously forming a spiral wound tube and lining an interior surface of the tube with a tubular lining, the apparatus comprising a winding mandrel, an elongated extruded extension coaxially supported in the winding mandrel, a winding belt cooperative with the winding mandrel for forming and driving a spiral tube about and along the winding mandrel; the elongated extruder extension including an extrusion nozzle having an extrusion orifice for forming a tubular lining from flowable lining material; fluid pressure means for radially urging the tubular lining against the interior of the spiral wound tube, and plug means for creating a fluid retaining chamber within a section of the tubular lining.

Another object of this invention is the provision of a novel device constructed in accordance with the above objects wherein the plug means for creating the fluid retaining chamber is a tapered plug having a normal maximum diameter slightly less than the desired internal diameter of the tubular lining.

Another object of this invention is to provide a novel device adapted to be arranged internally of a tube winding mandrel for forming a tubular lining within a spiral wound tube, the device including an elongated extruder extension, an extrusion nozzle having an extrusion orifice secured to the extruder extension, a bore in communication with the extrusion orifice for communicating flowable lining material from an extruder through the extrusion orifice to form a tubular lining, first means for urging the formed tubular lining radially outwardly with respect to the extrusion nozzle into contact with an interior surface of the spiral wound tube and second means supported by the extruder extension beyond the first means for pressuring or urging the tubular lining firmly against the interior surface of the spiral wound tube.

Another object of this invention is to provide a novel device of the character immediately above described, the first means being a source of vacuum acting against an exterior surface of the tubular lining and the second means is a plurality of rollers having peripheral portions establishing an effective diameter substantially equal to a desired internal diameter of the tubular lining.

Still another object of this invention is the provision of a novel mechanism for extruding a tubular lining internally of a spiral wound tube, the mechanism having an elongated extruder extension, an extrusion nozzle secured to the extruder extension, an extrusion orifice in the extrusion nozzle for forming a tubular lining from a source of flowable lining material, cooling means being arranged between the extrusion nozzle and a heating device for intially solidifying the tubular lining and thereafter heating the tubular lining to allow the same distend toward an interior surface of the spiral wound tube, adhesive applying means arranged to direct adhesive material against an exterior surface of the tubular lining, and means for conditioning the exterior surface of the tubular lining prior to the application of the adhesive material thereto.

A further object of this invention is a novel method of extruding a tubular lining into a simultaneously wound spiral tube including the steps of providing a source of flowable lining material and extruding the lining material into tubular form, simultaneously winding a spiral tube, and expanding the tubular lining by fluid pressure into adhering contact with an interior surface of the spiral wound tube.

A further object of this invention is to provide a novel method of simultaneously winding a spiral tube and extruding a tubular lining therein by extruding flowable lining material into tubular form into an interior of a spiral wound tube, and radially expanding the tubular lining by a source of fluid pressure into contact with the interior of the spiral wound tube while simultaneously heating the tubular lining during the expanding of the tubular lining into contact with the spiral wound tube.

With the above, and other objects in view that will hereinafter appear, the nature of the invention will be more clearly understood by reference to the following detailed description, the appended claims and the several views illustrated in the accompanying drawings.

In the drawings:

FIGURE 1 is a schematic view of a novel apparatus for simultaneously winding a spiral tube and extruding a tubular lining therein, and illustrates an extruder, an extruder extension rotatably journalled to the extruder and coaxially mounted in a mandrel of a spiral winder, a driving or winding belt for spirally wrapping two webs into a tube and driving the tube along the mandrel of the spiral winder, a nozzle carried by the extruder extension for extruding a tubular lining into the interior of the spiral wound tube, a drive mechanism for synchronously rotating the extrusion nozzle and the winding belt, and a reciprocating cutting mechanism for severing the tube into discrete lengths to form can bodies.

FIGURE 2 is an enlarged fragmentary sectional view taken through the extruder extension and extrusion nozzle of FIGURE 1, and shows anti-friction bearings rotatably mounting the extrusion nozzle in the interior of the mandrel of the spiral winder, a pair of carbon brushes contacting a pair of slip rings carried by the extruder extension for providing electrical energy to heat an insulated strip heater wound about an exterior of the extruder extension, and a conduit supplying air under pressure through the extrusion nozzle, and a plug for creating an air chamber in which air pressure is built up for distending the tubular lining radially outwardly into contact with the interior surface of the spiral wound tube.

FIGURE 3 is a fragmentary vertical sectional view of an extruding device similar to that illustrated in FIGURE 2 of the drawings, and illustrates an extrusion die or nozzle rotatably driving a tubular extruder extension carrying a plug at one end thereof, cooling means adjacent the extrusion nozzle for solidifying a tubular lining formed by the extrusion nozzle, means for conditioning an exterior surface of the formed tubular lining, adhesive applying means and means for heating the tubular lining adjacent the plug.

FIG. 4 is a fragmentary sectional view of another extruding device similar to the devices of FIGURES 2 and 3, and illustrates an extrusion nozzle carrying a plurality of offset rollers firmly pressing a tubular lining against the interior surface of a spiral wound tube and a source of vacuum in communication with a chamber between a spiral wound tube and the tubular lining for urging the tubular lining radially outwardly into adhering contact with the interior surface of the spiral wound tube.

FIGURE 5 is a cross-sectional view taken along line 5—5 of FIGURE 4, and more clearly illustrates the plurality of rollers carried by the extrusion nozzle.

An apparatus constructed in accordance with this invention for lining a spiral tube and simultaneously providing the same with a tubular lining is illustrated in FIGURE 1 of the drawings, and is generally designated by the reference numeral 10.

The apparatus 10 includes an extruder 11 which is provided with plastic material, such as polyethylene, through a hopper 12. The extruder 11 is driven by a suitable motor 13 in a conventional manner. An output conduit 14 of the extruder 11 is connected in a conventional manner to a rotating union connection 15.

An air compressor 16 supplies air under pressure through a conduit 17, an automatic pressure regulating valve 18, and a pressure gauge 20 through the rotating union connection 15 into a conduit 21 (see FIGURE 2). The conduit 21 is arranged coaxially in an extension 22 of the extruder 11. The extruder extension 22 is elongated and rotatably mounted by a plurality of identical antifriction bearings 23 (see FIGURE 2) in a tubular mandrel 24 of a spiral winder 25.

The extruder extension 22 is rotated by a drive mechanism 26 (FIGURE 1). The drive mechanism 26 includes a drive motor 27 having a rotatable output shaft 28 coupled to a variable speed drive 30. The variable speed drive 30 is conventional and includes a rotatable output shaft 31 the speed of which may be increased or decreased by manually turning a variable speed regulator 32 of the variable speed drive 30 in the directions indicated by the double-headed arrow 33. The rotatable output shaft 31 of the drive mechanism 26 rotates a chain drive 34, a shaft 35 and another chain drive 36 to rotate the extruder extension 22 in a manner clearly illustrated in FIGURE 1 of the drawings.

Webs or strips of paper or similar flexible material 37 and 38 are fed from a suitable source in a known manner toward and about the mandrel 24 of the spiral winder 25. A surface of the web 38 which contacts the web 37 is coated with an adhesive (not illustrated).

A driving or winding belt 40 is entrained about a driven pulley 41 and a driving pulley 42. The driving or winding belt 40 supplies both a spiral wrapping force to form a spiral wound tube 43 and a driving force to move the wound tube 43 in a linear direction over the mandrel 24 and therebeyond.

The driving pulley 42 which imparts motion to the driving or winding belt 40 is driven by the shaft 35 through a plurality of identical beveled gears 44 and a shaft 45. Since the shaft 35 drives both the extruder extension 22 and the driving belt 40 through the driving pulley 42, the linear velocity of the spiral wound tube 43 and a tubular lining formed therein can be synchronized in a manner which will be more fully described hereafter.

The output shaft 31 of the drive mechanism 26 also drives a reciprocating cutting mechanism or flying shear 46. The reciprocating cutting mechanism 46 includes a shaft 47 carrying a blade 48 which rotates and severs the spiral wound tube 43 into discrete lengths to form can bodies therefrom.

As is best illustrated in FIGURE 2 of the drawings, the extension 22 of the extruder 11 terminates in an extrusion nozzle 50 at an end thereof remote from the union connection 15. The extrusion nozzle 50 includes a first body portion 51 secured to a second body portion 52 by a plurality of identical screws 53. The first body portion 51 is an integral part of the extruder extension 22. An axial bore 54 of the extruder extension 22 is placed in fluid communication with an annular chamber 55 formed in a face 56 of the first body portion 51 by a plurality of circumferentially spaced passages 57.

A continuous annular extrusion orifice 58 is circumferentially formed between the second body portion of the extrusion nozzle 50 and a third central body portion 59 and places the annular chamber 55 of the first body portion in communication with an interior portion 60 of the spiral wound tube 43. The third body portion is also secured to the first body portion by screws 53. The orifice 58 opens through a flat face 61 of the extrusion nozzle 50.

The conduit 21 is threadably secured to the first body portion 51 of the extrusion nozzle 50 in a manner clearly illustrated in FIGURE 2 of the drawings and is placed in fluid communication with an axial bore 62 of the extrusion nozzle 50. The axial bore 62 is counterbored and threaded at 63 for threadably receiving therein a reduced end portion 64 of a plug 65. The plug 65 is preferably constructed from a polymerized tetrafluoroethylene plastic, sold under the trademark "Teflon" and has a maximum diameter which is slightly less than the desired internal diameter of a tubular lining 66 extruded by the extrusion nozzle 50 in a manner to be described more fully hereafter. An axial bore 67 and a plurality of radial bores 68 in the reduced end portion 64 of the plug 65 place the axial bore 62 in the extrusion nozzle 50 in fluid communication with a chamber 70 between a portion of the plug 65 and the tubular lining 66.

A strip heater 71 encased in a thermal insulating jacket 72 surrounds the extruder extension 22 and extends along substantially the entire length thereof. The strip heater 71 is energized by a suitable source of alternating electrical energy 73 through an electrical circuit 74. The electrical circuit 74 includes a variable potentiometer 75, a switch 76 and a pair of spring biased carbon brushes 77. The carbon brushes 77 each contact an identical slip-ring 78 carried by an annular insulating member 80 which is bonded or otherwise secured to the rotatable extruder extension 22. An identical lead 81 is connected between a respective one of each of the slip rings 78 and the strip heater 71.

In the operation of the apparatus of FIGURES 1 and 2, the extruder 11 functions in a conventional manner and forces flowable lining material such as polyethylene through the outlet conduit 14, the rotating union connection 15 and the bore 54 of the extruder extension 22 toward the extrusion nozzle 50. At the same time, air under pressure is communicated from the air compressor 16 through the conduit 17, the automatic pressure regulating valve 18 and the conduit 21 toward the extrusion nozzle 50. Simultaneously with the flow of lining material through the extruder extension 22 and the flow of pressurized air through the conduit 21, the winding belt 40 (see FIGURE 1) winds the webs or strips of flexible material 37 and 38 upon the mandrel 24 of the spiral winder 25 and drives the spiral wound tube 43 from left-to-right as viewed in FIGURE 1.

The strip heater 71 maintains the lining material flowable as it travels the length of the extruder extension 22, through the plurality of orifices 57, the annular chamber 55 and the extrusion orifice 58. The extrusion orifice 58 forms the lining material into the spiral wound tube 43.

The pressurized air passes through the conduit 21, the axial bore 62 of the extrusion nozzle 50, the bore 67 and the radial bores 68 of the plug 65, into the chamber 70 between the tubular lining 43 and the plug 65. The pressurized air in the chamber 70 distends the tubular lining by urging the tubular lining 66 radially outwardly into contact with the interior of the spiral wound tube 43 causing a reduction in the wall thickness of the tubular lining 66. This "blowing" causes the tubular lining 66 to distend until the instant the tubular lining 66 contacts the interior of the spiral wound tube 43.

The heated tubular polyethylene lining 66 adheres to the interior of the spiral wound tube 43 and is drawn by the spiral wound tube 43 toward and beyond the Teflon plug 65. As was noted heretofore, the maximum diameter of the Teflon plug 65 is slightly less than the desired maximum internal diameter of the tubular lining 66. This dimensioning permits some of the air in the chamber 70 to escape between the periphery of the plug 65 and the interior surface of the tubular lining 66, thereby allowing any excess pressure to bleed from the chamber 70.

During the formation of the spiral wound tube 43 and the tubular lining 66, the drive mechanism 26 (see FIGURE 1) synchronizes the rotational speed of the extrusion nozzle 50 and the spiral wound tube 43. The extruded tubular lining 66 is therefore rotated in synchronism with the spiral wound tube 43 which prevents twisting of the tubular lining 66 with respect to the tube 43.

As the spiral wound tube 43 and the tubular lining 66 pass beyond the Teflon plug 65, the reciprocating cutting mechanism 46 (see FIGURE 1) cuts the now lined spiral wound tube 43 into discrete lengths to form can bodies. The cutting mechanism 46 is reciprocated in a well known manner through the output shaft 31 of the drive mechanism 26 to assure desired uniform cut lengths of tubes irrespective of the speed at which the spiral wound tube 43 and tubular lining 66 are being formed.

Another apparatus for spirally winding a tube and extruding a tubular lining therein is illustrated in FIGURE 3 of the drawings, and is generally designated by the reference numeral 85. The apparatus 85 includes a spiral winder substantially identical to the spiral winder 25 of FIGURE 1 having a frame 86 supporting an elongated tubular winding mandrel 87. The frame 86 is arranged adjacent an extrusion nozzle 88 of a conventional extruder 90. The extrusion nozzle 88 is substantially identical to the extrusion nozzle 50 of FIGURE 2 except that the threaded counterbore 63 of the extrusion nozzle 50 has been replaced by bore 91 and the extrusion nozzle 88 is rotatably driven by a chain drive mechanism 92 in a conventional manner.

A conduit 93 forming an extension of the extruder 90 is secured to the extrusion nozzle 88 and extends axially through the mandrel 87. A bore 94 of the conduit or extruder extension 93 is in fluid communication with the bore 91 of the extrusion nozzle 88, the latter bore being in communication with a source of pressurized air (not shown). A plurality of radial bores 95 which gradually increase in diameter away from the extrusion nozzle 88 are formed in the extruder extension 93.

A tapered Teflon plug 96 having a threaded reduced portion 97 is secured to a bored and threaded portion 98 of the extruder extension 93.

A cooling mechanism 100 has an annular chamber 101 surrounding but spaced from the extruder extension 93. The annular chamber 101 of the cooling mechanism 100 is secured to the extrusion nozzle 88 of the extruder 90. An outermost wall 102 of the annular chamber 101 is provided with a pair of circumferential rows of apertures 103, each row of apertures opening into an annular channel member 104. An input pipe 105 and a return pipe 106 are connected to an associated one of the annular chamber members 104. The pipes 105 and 106 are suitably supported (not illustrated) to prevent rotation of these pipes as the annular chamber 101 is rotated by the extrusion nozzle 88. Two annular outer members 107 and 108, and a central annular member 110 are each secured to the outermost wall 102 of the chamber 101 by a plurality of identical screws 111. The members 107, 108 and 110 are arranged to confine the annular channel-like members 104 in sealing contact with the outermost wall 102 of the chamber 101 and form a pair of circumferential slots 112 through which the pipes 105 and 106 extend.

A conventional corona discharge ring 113 is suitably supported by means not shown internally of the tubular mandrel 87 surrounding the extruder extension 93. The corona discharge ring 113 is connected by a pair of leads 114 extending through an aperture 115 in the mandrel frame 86 through a suitable source of alternating potential energy 116. When a switch 117 is closed, the corona discharge ring 113 is energized and conditions an exterior surface of an extruded tubular lining 120 in a known manner to make the same more adhesively bondable.

A conduit 121 in communication with a source of adhesive, such as, for example, paraffin (not shown) is secured to the mandrel frame 86 and is placed in communication by a bore 122 with an annular groove 123 in the mandrel 87. A plurality of circumferentially arranged adhesive emitting orifices 124 project radially inwardly from the annular chamber 123 toward the extruder extension 93. Adhesive is communicated through the conduit 121, the bore 122, the annular chamber 123 and the plurality of adhesive emitting orifices 124 to coat the exterior surface of the tubular lining 120. Excess adhesive is drained off by semi-annular grooves 125 and 126 in the mandrel 87 through conduits 127 and 128 to an adhesive reservoir (not shown).

An electric heater 130, having a heating coil 131 encased in an annular jacket 132, is suitably mounted in the mandrel 87, spaced from, but surrounding the extruder extension 93 and the tubular lining 120. The heater coil 131 is connected to a suitable source of alternating potential energy 133 by a pair of leads 134. The leads 134 extend through a bore 135 in the winder frame 86 and a bore 136 in the mandrel 87. A variable potentiometer 137 and a switch 138 are used to regulate and energize or deenergize the electric heater 130 in a well known manner.

As the extrusion nozzle 88 is rotated the tubular lining 120 is extruded through the extrusion nozzle orifice (unnumbered) in a conventional manner. As the tubular lining 120 leaves the extrusion nozzle 88, the tubular lining 120 is solidified by the cooling mechanism 100. A suitable coolant, such as water, is introduced through the input pipe 105, circulates through the annular chamber 101 and leaves through the return pipe 106 to a coolant reservoir (not shown). The solidification of the tubular lining 120 does not render the tubular lining self-supporting and air under pressure impinging against the interior surface of the tubular lining 120 through the plurality of radial bores 95 in the extruder extension 93 maintains the tubular lining 120 equally spaced about the extruder extension 93.

As heretofore noted, the corona discharge ring 113 conditions the exterior surface of the tubular lining 120 in a conventional manner for the application thereto of adhesive through the adhesive emitting orifices 124 arranged in the mandrel 87 of the winder frame 86.

The electric heater 130 softens the tubular lining 120 as it passes therethrough toward the tapered Teflon plug 96. The now softened tubular lining begins to distend because of the air pressure in a chamber 140 between the interior surface of the tubular lining 120 and the surfaces of the extruder extension 93 and the plug 96. The heated tubular lining 120 distends radially outwardly until the instant it contacts a spiral wound tube 142 which is linearly advancing and rotating in a manner identical to that heretofore discussed in connection with FIGURE 1 of the drawings.

The air pressure "blowing" against the interior of the tubular lining 120 causes the wall thickness thereof to progressively decrease until the tubular lining 120 contacts the interior surface of the spiral tube 142. The adhesive applied to the exterior surface of the tubular lining 120 effectively adheres the tubular lining to the interior surface of the spiral wound tube 142 as it is being drawn toward and beyond the tapered plug 96. The tapered plug 96 is dimensioned identical to the tapered plug 65 of FIGURE 2 and functions in a manner identical to that heretofore described. The apparatus 85 thus forms a spiral tube 142 and simultaneously extrudes a tubular lining 140 therein which is subsequently cut into discrete lengths to form lined can bodies.

An apparatus 145 of FIGURE 4 of the drawings is similar to the apparatus 10 and 85 of FIGURES 1 and 3.

The apparatus 145 includes a winder frame 146 supporting a tubular winding mandrel 147. An elongated tubular extruder extension or conduit 148 is connected to a conventional extruder and is rotatably journalled by a plurality of identical anti-friction bearings 150 in the mandrel 147 of the winder frame 146.

The extruder extension 148 includes an extrusion nozzle 151 which is substantially identical to the extrusion nozzle 50 of FIGURE 2, and a description thereof is considered unnecessary for a complete understanding of this embodiment of the invention.

An annular gasket or sealing gland 152 is positioned between the extrusion nozzle 151 and an internal surface of the mandrel 147. The sealing gasket 152 maintains a chamber 153 between a spirally wound tube 154 and a tubular lining 155 extruded by the extrusion nozzle 151 under slight negative air pressure supplied from a suitable source of vacuum 156. The source of vacuum 156 is placed in communication with the chamber 153 by a vacuum line 157, a regulating valve 158, a gauge 160, a bore 161 in the winder frame 146 and a bore 162 in the mandrel 147.

A strip heater 163 encased in a thermal insulating jacket 164 surrounds the extruder extension 148 to maintain suitable lining material, such as polyethylene, flowable as it is forced by the conventional extruder (not shown) through the extruder extension 148 and the extrusion nozzle 151.

An axially arranged shaft 165 is secured to and supported by the extrusion nozzle 151. A block 166 is secured to the shaft 165 in spaced relationship to the nozzle 151. The block 166 is generally cylindrically shaped and includes twin rows of peripherally spaced journal arms 167 in which is journalled a first and second row of barrel rollers 168 and 170 respectively, arranged in approximately 11¼ offset relationship to each other. The peripheral portions of the barrel rollers 168 and 170 form an effective diameter which is substantially equal to the desired internal diameter of the extruded tubular lining 155.

When the tubular lining 155 is being extruded by the extrusion nozzle 151, the slight negative air pressure in the chamber 153 causes the tubular lining 155 to distend radially outwardly until the instant the tubular lining 155 contacts the interior of the spiral wound tube 154. During this distention of the tubular lining 155, the tubular lining 155 is reduced in wall thickness as the linearly moving spiral tube 154 draws the lining 155 from left-to-right as viewed in FIGURE 4 of the drawings. The plurality of offset barrel rollers 168 and 170 exert pressure on the tubular lining 155 to press it firmly against the interior of the spiral wound tube 154 and assist in effecting adhesion of the tubular lining to the spiral wound tube.

From the foregoing, it is seen that novel provision is made for providing a spiral wound tube with a tubular lining. However, various changes and modifications will become readily apparent to one skilled in the art after reading this disclosure and such modifications are within the scope of this invention.

For example, the extruder extensions 22, 93 and 148 may be non-rotatably mounted in the respective mandrels 24, 87 and 147 and the heating strips 71 and 163 can be replaced by a steam or hot water heated jacket.

The webs or strips of flexible material 37 and 38 could be plastic film or thin metal as well as paperstock material. These strips or webs 37 and 38 are preferably selected to produce a spiral wound tube which has an inner wrap of relatively thin, smooth paper followed by succeeding wraps of heavy paper or boardstock in any number of combinations and with the multiple layers limited only by the length of the mandrel required to accommodate the selected multiple webs or layers.

Furthermore, the innermost web may be pre-coated on its inner surface with a heat activatable adhesive. In such case the hot extruded lining will activate the adhesive to effect the necessary bonding of the lining to the spirally wound tube. Some combinations of inner web and lining materials are adherent when hot and when using such combinations, the use of an adhesive, either sprayed on as in FIG. 3 or pre-applied to the web stock is optional.

Under special circumstances, the plugs 65 and 96 may be hollow to permit heat dissipation and more rapid cooling of the tubular linings in the areas of maximum circumferential dimensions.

From the foregoing, novel and advantageous provision has been made for spirally winding tubes and simultaneously providing the same with extruded tubular linings. However, attention is again directed to the fact that variations may be made in the example apparatus without departing from the spirit and scope of the invention as defined in the appended claims.

We claim:

1. Apparatus particularly adapted for lining a spiral wound tube comprising a tube winding mandrel, a rotatable elongated extruder extension arranged coaxially in said mandrel, a tube winding belt cooperative with the winding mandrel to continuously form a spirally wound tube from a plurality of webs of material fed onto said mandrel, means for synchronously rotating said extension and driving said winding belt, an extrusion nozzle secured to the extruder extension, an extrusion orifice in said extrusion nozzle in communication with flowable lining material whereby a tubular lining is formed by the extrusion orifice, and means for urging the formed tubular lining radially outwardly into contact with the interior of the tube as it is being formed, thereby lining the tube with the flowable lining material.

2. The apparatus as defined in claim 1 wherein said urging means includes fluid pressure acting against the interior of the tubular lining.

3. Apparatus particularly adapted for lining a spiral wound tube comprising a tube winding mandrel, an elongated extruded extension arranged coaxially in and rotatable relative to said mandrel, a tube winding belt cooperative with the winding mandrel to continuously form a spirally wound tube from a plurality of webs of material fed onto said mandrel, said tube winding belt being adapted to be driven relative to said mandrel, an extrusion nozzle secured to the extruder extension, an extrusion orifice in said extrusion nozzle in communication with flowable lining material whereby a tubular lining is formed by the extrusion orifice, means for urging the formed tubular lining radially outwardly into contact with the interior of the tube thereby lining the tube with the flowable lining material, and said urging means includes a source of vacuum in communication with a chamber between the tubular lining and the tube.

4. The apparatus as defined in claim 1 wherein second means are provided for forcing the tubular lining into intimate contact with the tube and assuring adhesion between the tubular lining and the tube.

5. The apparatus as defined in claim 2 wherein said urging means includes a smooth-surfaced plug having a diameter slightly less than the desired internal diameter of the tubular lining.

6. The apparatus as defined in claim 3 wherein second means are provided for forcing the tubular lining into intimate contact with the tube, said second means being a plurality of rollers supported by the extruder extension and said rollers including peripheral surface portions establishing an effective diameter substantially equal to the desired internal diameter of the tubular lining.

7. A device adapted to be arranged internally of a tube winding mandrel for forming a tubular lining internally of a tube being wound from a plurality of webs of material fed upon the winding mandrel comprising, an elongated extruder extension adapted to be connected to an extruder, an extrusion nozzle secured to the extruder extension, an extrusion orifice in the extrusion nozzle, a bore in communication with the extrusion orifice adapted to communicate flowable lining material from an extruder through the extrusion orifice to form a tubular lining, heating means located along at least a portion of the extruder extension, cooling means between the extrusion nozzle and the heating means, fluid pressure means providing fluid pressure acting against the interior of the tubular lining for urging the formed tubular lining radially outwardly with respect to the extrusion nozzle, and plug means supported by the extruder extension for creating a fluid retaining chamber within the formed tubular lining.

8. The device as defined in claim 7 wherein said plug has a maximum diameter slightly less than the internal diameter of the tubular lining.

9. The device as defined in claim 8 wherein said fluid pressure means includes a conduit in the bore of the extruder extension in communication with a fluid pressure source and said extrusion nozzle; said extrusion nozzle and plug including port means in communication with the conduit and the fluid retaining chamber between the tubular lining and the plug for subjecting said chamber to fluid pressure from said fluid pressure source.

10. The device as defined in claim 8 wherein adhesive applying means are arranged to direct adhesive toward the exterior of the tubular lining.

11. The device as defined in claim 8 wherein the plug and the heating means are supported at an end of the extruder extension remote from the extrusion nozzle.

12. The device as defined in claim 10 wherein means are provided for conditioning the exterior of the tubular lining to improve the adhesion characteristics thereof prior to the application of an adhesive thereto by the adhesive applying means.

13. Apparatus particularly adapted for lining a tube comprising a source of web material, means for continuously forming a tube from the web material, means for advancing the tube exteriorly of means for extruding a tubular lining in the tube as the latter is advanced, means for urging the tubular lining radially outwardly into contact with the interior of the tube hereby lining the tube, and said urging means being a source of vacuum in communication with a chamber between the tubular lining and the tube for creating a vacuum in said chamber whereby fluid pressure interiorly of the lining causes the same to be urged radially outwardly.

14. Apparatus particularly adapted for lining a tube comprising means for continuously forming a tube, means for advancing the tube, means for positioning a tubular lining in the tube as the latter is advanced, means for urging the tubular lining radially outwardly into contact with the interior of the tube thereby lining the tube, said urging means including a source of fluid pressure acting against the interior of the tubular lining, a plug having a diameter slightly less than the desired internal diameter of the tubular lining thereby defining a chamber with the lining into which the fluid pressure is admitted for urging the lining against said tube, and from which the fluid pressure is emitted between the plug and the lining, and means for placing said source of fluid pressure in fluid communication with said chamber.

15. The apparatus as defined in claim 14 wherein said positioning means includes extrusion means in fluid communication with flowable lining material whereby the tubular lining is extruded into the tube during advancement of the latter along said predetermined path.

16. A method of extruding a tubular lining into a tube comprising the steps of providing a source of flowable lining material, seaming longitudinal edge portions of web material to form a continuous tube, extruding the flowable material in tubular form into the interior of the continuously formed tube, forming a substantially closed fluid chamber internally of the tubular lining, and introducing a fluid media into the chamber which radially expands the tubular lining into adhering contact with the interior of the tube.

17. A method of extruding a tubular lining into a tube comprising the steps of providing a source of flowable lining material, extruding the flowable material in tubular form into the interior of a continuously formed tube, forming a substantially closed fluid chamber internally of the tubular lining, introducing a fluid media into the chamber which radially expands the tubular lining into adhering contact with the interior of the tube, and drawing a vacuum exteriorly of the tubular lining adjacent the chamber whereby atmospheric pressure in the chamber expands the tubular lining radially outwardly into adhering contact with the interior of the tube.

18. A method of forming a lined tube comprising the steps of spiral winding web material to form a continuous tube, advancing and rotating the tube incident to the spiral winding thereof, extruding a lining into the interior of the tube, and rotating the lining in synchronism with the rotation of the tube.

19. The method of forming a liner tube as defined in claim 18 wherein the tube and the lining are rotated and advanced in the same direction at substantially identical speeds.

20. The method of forming a lined tube as defined in claim 18 including the step of drawing a vacuum between the lining and the tube whereby the lining is urged radially outwardly against the tube.

21. The method of forming a lined tube ts defined in claim 18 including the step of mechanically pressing the lining radially outwardly against the tube after the lining has been applied thereto.

22. Apparatus particularly adapted for lining a spiral wound tube comprising a tube winding mandrel, an extrusion nozzle, means for rotating the extrusion nozzle, means for winding a plurality of webs of material upon the winding mandrel to form a spiral tube, said winding means being effective to rotate and advance the tube, an extrusion orifice in said extrusion nozzle for forming a tubular lining internally of the tube, and means for synchronizing the rotation of said extrusion nozzle and the operation of said winding means to advance and rotate the tube and lining in identical directions at substantially identical speeds.

23. The apparatus as defined in claim 22 including means for urging the formed tubular lining radially outwardly into contact with the interior of the tube, and said urging means includes a source of vacuum in fluid communication with a chamber between the tubular lining and the tube.

24. The apparatus as defined in claim 22 including means for urging the formed tubular lining radially outwardly into contact with the interior of the tube, and second means for mechanically forcing the tubular lining into intimate contact with the tube thereby assuring adhesion between the tubular lining and the tube.

25. The apparatus as defined in claim 24 including means for urging the formed tubular lining radially outwardly into contact with the interior of the tube, and said urging means includes a plug having a diameter slightly less than the desired internal diameter of the tubular lining.

References Cited

UNITED STATES PATENTS

| | | | |
|---|---|---|---|
| 2,910,723 | 11/1959 | Traver | 204—168 |
| 1,047,946 | 12/1912 | Jenkins | 93—80 |
| 2,132,239 | 10/1938 | Harrison | 93—80 |
| 2,502,638 | 4/1950 | Becht | 156—195 X |
| 3,056,339 | 10/1962 | Sommerfeld et al. | 18—14 |
| 3,126,306 | 3/1964 | Sherman | 156—244 X |
| 1,676,351 | 7/1928 | Robinson | 156—500 |
| 3,132,062 | 5/1964 | Lang et al. | 156—294 X |
| 2,512,844 | 6/1950 | Weber | 18—14 |
| 3,184,358 | 5/1965 | Utz | 18—14 |
| 3,082,484 | 3/1963 | Sherman | 156—287 |
| 3,084,386 | 4/1963 | Gerwo | 264—95 XR |

FOREIGN PATENTS 536,602   1/1957   Canada.

EARL M. BERGERT, *Primary Examiner.*

P. DIER, *Assistant Examiner.*